United States Patent [19]

Röss et al.

[11] Patent Number: 5,049,175
[45] Date of Patent: Sep. 17, 1991

[54] METHOD OF MANUFACTURING A GLASS BODY HAVING A NON-UNIFORM REFRACTIVE INDEX

[75] Inventors: Dieter Röss, Hösbach-Feldkahl; Karlheinz Rau, Hanau; Hans-Ulrich Bonewitz, Hammersbach, all of Fed. Rep. of Germany

[73] Assignee: Heraeus Quarzschmelze GmbH, Hanau, Fed. Rep. of Germany

[21] Appl. No.: 183,523

[22] Filed: Apr. 19, 1988

Related U.S. Application Data

[63] Continuation of Ser. No. 930,954, Nov. 12, 1986, abandoned, which is a continuation of Ser. No. 539,120, Oct. 5, 1983, abandoned.

[30] Foreign Application Priority Data

Nov. 2, 1982 [DE] Fed. Rep. of Germany ....... 3240355

[51] Int. Cl.⁵ .................. C03B 19/06; C03B 37/012
[52] U.S. Cl. .......................... 65/3.11; 65/2; 65/18.1; 65/144; 264/1.2; 264/1.7; 264/57; 264/60
[58] Field of Search ............ 65/18.1, 3.12, 3.2, 65/3.11, 18.2, 144, 18.3, 18.4, 21.5, 35; 264/1.5, 125, 1.2, 1.7, 2.6, 57, 60

[56] References Cited

U.S. PATENT DOCUMENTS

| | | | |
|---|---|---|---|
| 1,173,688 | 2/1916 | Thomson | 65/18.1 |
| 1,599,084 | 9/1926 | Gibson | 264/60 |
| 2,169,384 | 8/1939 | Hall | 428/542.8 |
| 2,169,385 | 8/1939 | Hall | 428/542.8 |
| 2,169,386 | 8/1939 | Hall | 428/542.8 |
| 3,505,158 | 4/1970 | Murray | 264/60 |
| 3,533,767 | 10/1970 | Grant | 65/18.1 |
| 3,823,995 | 7/1974 | Carpenter | 65/3.12 |
| 3,888,646 | 6/1975 | Kuriyama et al. | 65/18.1 |
| 4,017,288 | 4/1977 | French | 65/3.12 |
| 4,054,435 | 10/1977 | Sakane et al. | 65/18.3 |
| 4,061,486 | 12/1977 | Jahn | 65/18.4 |
| 4,062,665 | 12/1977 | Izawa et al. | 65/2 |
| 4,135,901 | 1/1979 | Fujiwara | 65/18.2 |
| 4,230,473 | 10/1980 | Miller | 65/18.2 |
| 4,259,101 | 3/1981 | Tsukuda | 65/18.2 |
| 4,363,647 | 12/1982 | Bachman | 65/18.2 |
| 4,378,986 | 4/1983 | Yanase | 65/18.2 |
| 4,414,012 | 11/1983 | Suto | 65/18.2 |
| 4,417,910 | 11/1983 | Passaret | 65/18.2 |
| 4,427,785 | 1/1984 | Prochazka | 264/1.2 |
| 4,443,239 | 4/1984 | Biswas | 65/18.1 |
| 4,544,517 | 10/1985 | Ohno | 264/60 |

FOREIGN PATENT DOCUMENTS

| | | | |
|---|---|---|---|
| 0081282 | 6/1983 | European Pat. Off. | |
| 0084438 | 7/1983 | European Pat. Off. | 65/18.1 |
| 0086132 | 8/1983 | European Pat. Off. | |
| 2715333 | 10/1981 | Fed. Rep. of Germany | |
| 26977 | 2/1977 | Japan | 264/125 |
| 54-07355 | 1/1979 | Japan | 65/18.1 |
| 54-10316 | 1/1979 | Japan | 65/18.1 |
| 55-45499 | 11/1980 | Japan | 65/3.11 |
| 56-32344 | 4/1981 | Japan | 65/18.2 |
| 56-129621 | 10/1981 | Japan | 65/18.1 |
| 57-05003 | 1/1982 | Japan | 65/3.14 |
| 925883 | 5/1982 | U.S.S.R. | 65/18.1 |
| 454071 | 9/1936 | United Kingdom | 65/18.1 |
| 536279 | 5/1941 | United Kingdom | 65/18.1 |
| 2017077 | 10/1979 | United Kingdom | |
| 2018743 | 10/1979 | United Kingdom | 65/18.1 |
| 2032910 | 5/1980 | United Kingdom | |
| 2059944 | 4/1981 | United Kingdom | |

OTHER PUBLICATIONS

Random House College Dictionary; Jess Stein; Revised Edition; p. 575, 1975, Random House Inc.
Webster's Ninth New Collegiate Dictionary, 1983; Merriam–Webster Inc., p. 532.

Primary Examiner—Kenneth M. Schor
Attorney, Agent, or Firm—Felfe & Lynch

[57] ABSTRACT

A granular body, from which an article having a nonuniform refractive index may be formed, has grains of two substances which have different refractive indicies in a geometric distribution in the granular body corresponding to the geometric distribution of the substances required for the nonuniform refractive index of the article and a way of shape-stabilizing the granular body. A method of making the granular body comprises controllably feeding the grains into the geometric distribution in the granular body and shape-stabilizing it. Preferably the granular body is compressed into a porous compact which holds itself together and is treated with a gas to achieve desired optic properties in the article.

18 Claims, 7 Drawing Sheets

METHOD OF MANUFACTURING A GLASS BODY HAVING A NON-UNIFORM REFRACTIVE INDEX

This is a continuation of application Ser. No. 930,954 filed Nov. 12, 1986, now abandoned, which is a continuation of application Ser. No. 539,120 filed Oct. 5, 1983, now abandoned.

BACKGROUND OF THE INVENTION

The invention relates to a granular body and a method of manufacturing it, especially of $SiO_2$ for an article having a nonuniform refractive index.

Enlongated glass bodies can be used as so-called preforms for the production of optic fibers having nonuniform transverse refractive indices, preferably in the visible spectrum or in the short infrared wavelength range, for communication. In addition, such bodies can also be used for the production of glass rods or glass plates which have lens-like properties.

For optic fibers used for communication, the refractive index in the cross section of the fiber is greater at the core of the fiber than in the peripheral part thereof. In the case of the so-called monomode fibers and the so-called stepped index fibers, the refractive index transition between the axial or core area and the peripheral area or "cladding" is abrupt. Optical waves which propagate away from the core of the fiber are reflected back into the core at this abrupt transition. In the so-called multimode fibers, the refractive index gradually decreases from the core to the peripheral area, preferably in an exponential manner. In this case, waves which do not propagate parallel to the axis of the fiber are gradually turned toward the axis by a kind of lens effect to remain captive in the core or axial region.

For the rods and plates with lens-like properties mentioned above, a gradual reduction of the refractive index from the center of the body to the margin is prescribed, and again it should be exponential. Light rays passing through a parallel-sided plate of such glass are increasingly deflected toward the center such that the plate behaves optically like a lens.

In both applications, but especially in communications fibers because of the length of glass through which the rays must propagate, the precision of the glass must be very high with the absorption and scatter of the optical rays reduced to a minimum. Consequently, in the production of the fibers, the utmost purity must be achieved since residual absorption is due mostly to the presence of foreign substances. Moreover, the profile of the refractive index must follow the prescribed form very closely. The desired properties can be achieved, for example, by the use of high-purity fused silica as the basic material with other materials added to it, such as titanium dioxide, germanium oxide, fluorine, boron trioxide, and phosphorus pentoxide, to vary the refractive index of refraction. It has been found advantageous to use more than one dopant to achieve the desired properties. In this manner, for example, the internal tension due to a dopant can be adjusted to a desired level. It has also been found that the useful signal bandwidth of the fibers can be influenced to a great extent by precise control of the refractive index profile. For this purpose it can be advantageous to use refractive index profiles other than the exponential. For example, a step at the margin of an exponential index profile of the core has proven practical.

In the known processes, as disclosed, for example, in German Patent 2,715,333 or Offenlegungsschrift 2,313,203, it is possible in a simple manner only to produce cylindrically symmetric refractive index profiles, resulting in fibers of circular core cross section and circular fiber cross section. Although such fibers are suitable for communication, they have certain disadvantages. For example, they have no preference for a particular polarization of the light which they transmit. This is due to the wave-guiding nature of the optical fibers. A preference for certain polarizations is then produced by fortuitous tension distributions in the fiber, but these fluctuate rapidly and to a very great degree in practical operation, due to external influences, such as acoustic or mechanical influences.

It is also desirable to produce fibers with multiple cores, so that a plurality of communication channels can be contained in a single fiber. It has been possible to produce such fibers heretofore only from materials, such as low-melting glasses, and by methods, such as the multiple-crucible process, which do not result in the low attenuations necessary for communications.

The production of optic fibers is normally accomplished by first producing an elongated glass body having a refractive index profile that is similar to that which the later optic fibers are to have. This elongated glass body is then drawn at high temperature in to a fiber, while, due to the high viscosity of the material during the drawing process, the radial profile of the refractive index is largely preserved.

It is generally known that vitreous silica is used as the basic material for high quality communication fibers. It is also known that, theoretically, still greater bandwidths and still less attenuation can be achieved with other materials. These include, for example, a mixture of germanium oxide and antimony oxide or a whole series of known fluoride glasses. Also, optic fibers of more or less high attenuation can be produced from various crystals, plastics, and still other types of glass. The method of the invention is to be suitable for the use of all these materials equally.

SUMMARY OF THE INVENTION

An object of the present invention is a process for the production of enlongated granular bodies, especially of $SiO_2$, to serve as preforms for optic fibers or other optic components having a varying refractive index which will allow great freedom of geometric configuration, which will be independent of special properties of the glass or other substances, which uses a minimum of high temperature processes, and which can produce large preforms in a continuous process of low manufacturing cost.

To these and other ends, a process controls the geometric distribution of the substances which will determine the optic properties of an article made from a granular body by controlled feeding of grains of these substances into the shape of a granular body. It is possible in this manner to achieve any desired cross-sectional configuration of the desired substances, and thus their optic properties. The shape of the granular body is then stabilized during or after the controlled-feeding of the grains so that the geometric distribution of the grains determining the future optic properties will not be altered.

In a subsequent process, when the substances are glasses, a transparent glass body may be formed from this shape-stabilized granular body by heating in such a way that grains form a single glass body with the geometrical configuration of the substances of the granular body reduced proportionally during the vitrification process owing to the high viscosity of the glasses. It can be advantageous to compress the shape-stabilized granular body so as to form a porous, solid compact prior to the formation of the glass body. It is furthermore advantageous to subject the shape-stabilized granular body or porous compact to at least one gas treatment by which undesired substances such as water, for example, can be removed from the body while it is still granularly permeable to gas. Metal impurities can also be reduced and desired substances, such as hydrogen or helium for example, incorporated into the material in this way.

According to the present invention, first, starting substances are produced which, in vitrified or finished form, will have a uniform refractive index for each different substance. These substances are produced either directly in the finely granular form of grain diameters ranging from about 0.1 micrometer to about 1 millimeter in which they are to be used, or first a solid is produced from which the grains can be formed by grinding.

The following procedure has proven to be especially desirable for the production of preforms based on fused silica ($SiO_2$). Silica is prepared in finely granular form by the pyrolysis of silicon tetrachloride. These fine silica particles are collected and used in this form.

The process of causing silica particles produced by pyrolysis to grow axially or radially into a rod on a rotating support has also proven advantageous. This rod is then crushed in a ball mill after removal of the support.

For the practice of the invention, for one example, grains of one substance may consist of high-purity silica, and grains of another substance may contain, in addition to silica, one or more dopants, such as germanium oxide, titanium oxide, fluorine, or the like, in at least the highest concentration that is to be achieved in the glass body. These two granular substances are stored in separate hoppers. The grains of the different substances are taken from the hoppers at a specific rate through controllable shutters and poured onto a support. The pouring is performed such that a given distribution of the grains of the different substances results. In this manner, the refractive index profile that is achieved by the subsequent vitrification is already latent in the granular body.

The granular body, which in itself is loose, is held together or defined while it is being poured. A fused silica tube surrounding the granular body has proven practical for this.

After the granular body has been formed, this body, which is permeable to gases, is subjected to chemical treatment, preferably in a gas atmosphere. Chlorination for a period of two hours at 800° C. has proven to be a good method for the removal of undesired hydroxyl ions from a body having a diameter of 60 mm.

It is advantageous to compress the granular body, to such an extent that its shape will be stable without additional support. This compression has the additional advantage of increasing the density of the body, thereby reducing the amount of shrinkage that will occur when the glass body is formed. In the case of grains of fused silica produced by pyrolysis, an isostatic compression at a pressure above 500 bar, and preferably above 2,000 bar, has proven practical. The resultant porous compact bar is easy to handle, but is still completely permeable to gases. If desired, it can be subjected to additional chemical treatments in a gaseous atmosphere while in this state.

The finely porous compact is then converted to a dense glass body. This is performed preferably by drawing the elongated, finely porous compact slowly through an annular kiln surrounding it. Upon vitrification, a shrinkage in volume occurs, but this has no effect on the distribution of the components which determine the refractive index. If desired, the vitrification process can also be performed directly on the shape-stabilizer granular body without compressing it.

It is evident that the particular nature of the starting materials has nothing to do with the practice of the process. In the case of fused silica, for example, it is possible also to use grains obtained by grinding rock crystal or from high-purity quartz sand. It is also possible to use grains produced by grinding vitreous fused silica. In this case, the high purity of the material is not achieved as easily as in the case of pyrolytic method described above, yet the compacts thus obtained are of sufficient quality, for example, for the production of components having a lens-like action.

It is also evident that the described method can be used for materials other than fused silica, as long as these materials can be prepared in finely granular form and can be combined into a solid body, for example, by a vitrification process.

One special advantage of the process lies in the freedom it affords in the configuration of the geometric distribution of the grains and hence in the geometric arrangement of the refractive index profile of the glass body formed from the granular body. The method is not limited to the production of cylindrical fibers with cylindrical cores.

BRIEF DESCRIPTION OF THE DRAWINGS

Preferred embodiments which illustrate but do not limit the invention will now be described with reference to drawings in which.

DESCRIPTION OF THE PREFERRED EMBODIMENTS

Figure 1:
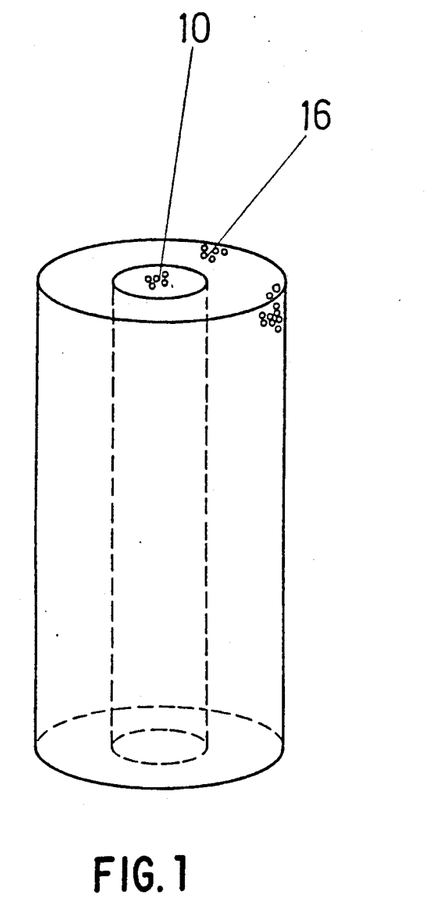
FIG. 1 is an embodiment of a granular glass body made by the method.
Figure 2:
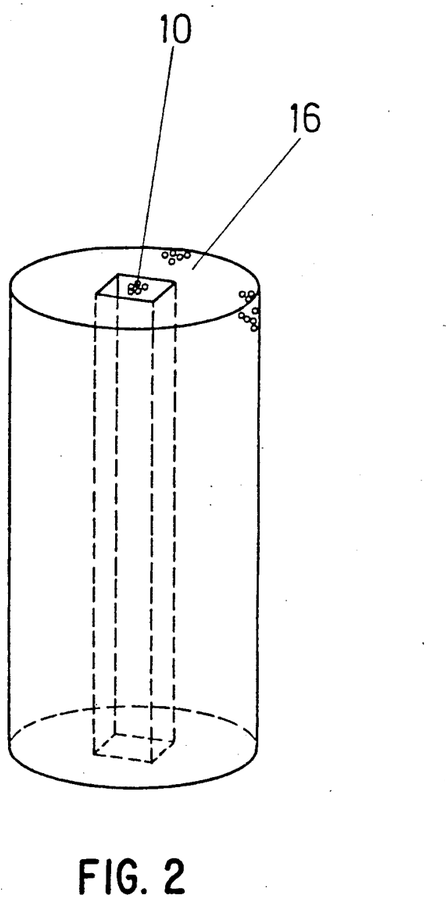
FIG. 2 is another embodiment of a granular glass body made by the method.
Figure 3:
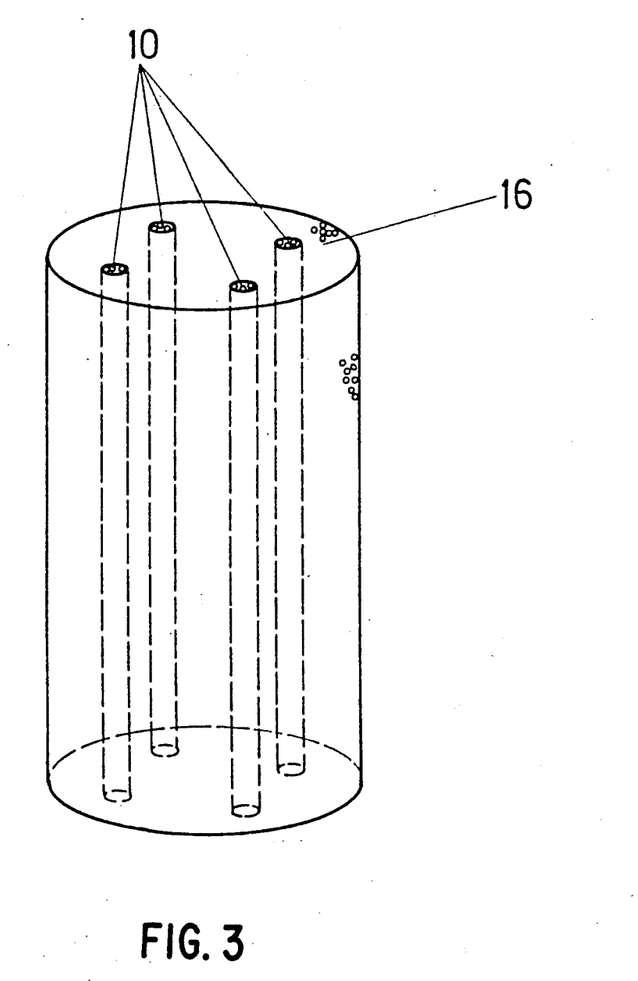
FIG. 3 is another embodiment of a granular glass body made by the method.

Granular bodies are represented in perspective in FIGS. 1, 2 and 3, grains 10 having been poured into a core region about the axis of the body and grains 16 poured around the core (cladding material). The core has a rectangular cross section in FIG. 2, and a circular cross section in FIG. 1. In FIG. 3, there are several cores of grains 10 spaced about the axis of the granular body.

Figure 4:
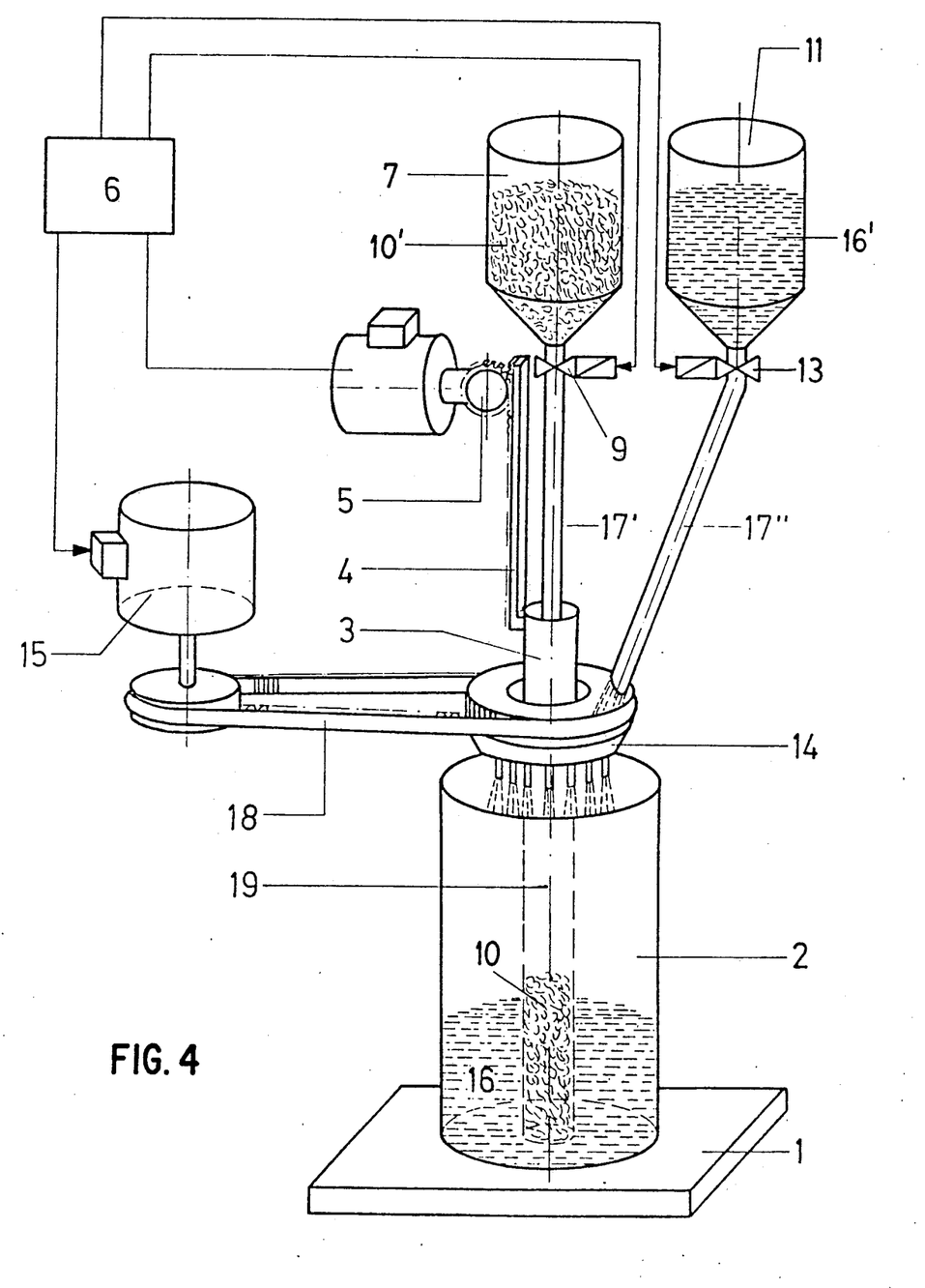
FIG. 4 shows, diagramatically, one apparatus for the method.

An arrangement suitable for the production of the granular bodies of FIGS. 1 and 2 which are preforms for a stepped index of refraction is represented in FIG. 4. A cylindrical or tubular quartz supporting body 2 is mounted on a base 1 and another quartz tube 3 is centered inside of quartz tube 2 and can be raised by means of a rack 4 driven by a pinion 5 to define the boundaries of the grains 10 and 16. Grains 10 of one substance which, after vitrification, will have the desired refractive index for the core of a stepped index fiber are in one hopper 7. In another hopper 11 are grains 16 of another substance which, after vitrification, will have the desired refractive index for the cladding of the stepped index fiber. The grains 10 are fed or poured through a feed tube 17' into the quartz tube 3 to form, rising from the base 1, the core. Grains 16 are poured through a feed tube 17" and, through an annular spreading spreading means 14 represented diagrammatically in the figure as a multiple-spout funnel driven about the cylinder axis 19 by means of a belt 18 powered by a motor 15, are uniformly spread around so that the cladding material 16 builds up on the support 1. As long as the quartz tube 3 remains on the floor of the support 1, the materials 10 and 16 are completely separated from one another. As the depth of the materials increases, the quartz tube 3 is elevated, so that the materials 10 and 16 will come in direct contact with one another. It is possible in this manner to build up a step profile at a high rate and a small investment in apparatus.

When the quartz tube 3 is raised, a certain amount of intermixing will occur at the boundary surface between the materials 10 and 16. This can be kept at an acceptable level by providing a sharp edge at the bottom of the quartz tube 3 and by providing that the tube 3 will be raised concurrently with like build-up of materials 10 and 16. To achieve this, the drives for the different mechanisms controlling the system are programmed through a common control unit 6. The uniformity of the pouring can be improved if periodical mechanical forces in the form of acoustical jogging or vibration act on the granular body while it is being poured. For this purpose the base 1 can be acted upon by an acoustical vibrator or by a jogging mechanism (not shown). The rate at which the grains 10 and 16 are fed from the hoppers 7 and 11 is controlled by means of valves or shutters 9 and 13.

It is easy to see that, in the system of FIG. 4, not only cylindrically symmetrical bodies can be produced, but also those of other geometrical profiles. For example, by replacing the cylindrical quartz tube 3 with a tube of rectangular cross section, the granular body can be made with a rectangular core, as represented in FIG. 2. Granular bodies can also be made with multiple cores as represented in FIG. 3 with the system of FIG. 4. For this purpose a plurality of quartz tubes are disposed within the quartz tube 2. The variability of the process of the invention with regard to the geometry of the granular body, especially its cross section, has the advantage that certain defined polarizations can be achieved in fibers with oval or, better, with a rectangular cross section. The circumferential shape of the granular body can be made rectangular, too, so that the position of the plane of polarization will be well defined. This is not easily achievable by the methods of the prior art.

It is characteristic of the granular bodies that can be made with the system represented in FIG. 4 that in particular areas of the cross section only grains of one or the other substance are to be found. Consequently, stepped index profiles can be produced, but not profiles of continuously varying refractive index, known as graded index profiles. A system represented in FIG. 5 is appropriate for the production of such profiles.

This diagrammatic representation shows a system for producing granular bodies of cylindrical shape; it is also suitable, however, for the production of granular bodies of any shape. A base 1' is set in rotation by a motor drive 20'. In one hopper 7' are grains of one substance 10, and in another hopper 11' are grains of another substance 16. By means of variable shutters 9' and 13', the grains are fed into a common feed line 23 through tubes 21 and 22, and are mixed together. A pouring nozzle 24 is moved horizontally under program control through a mechanical drive 25 by means of a controller 27 controlling the motor 26. The grains emerging from the open end of the pouring nozzle are thus deposited on the base 1' along a narrow spiral path. Then, as the base 1' continues to rotate and the pouring nozzle 24 moves back and forth horizontally as indicated by the arrow 37, the material is laid down in layers. The movement of the pouring nozzle is controlled such that, with the material being poured at a constant rate, its depth will be constant all across the base. In other words, the granular body is built up in spiral layers. During each movement of the pouring nozzle 24, the composition of the layer it is forming can be varied in a controlled manner by the operation of the shutters 9' and 13', and it is thus possible to produce any desired proportions in which grains of both substances can be deposited in the same unit of area. The system represented in FIG. 5 is thus suitable for the production of graded index preforms.

Figure 5:
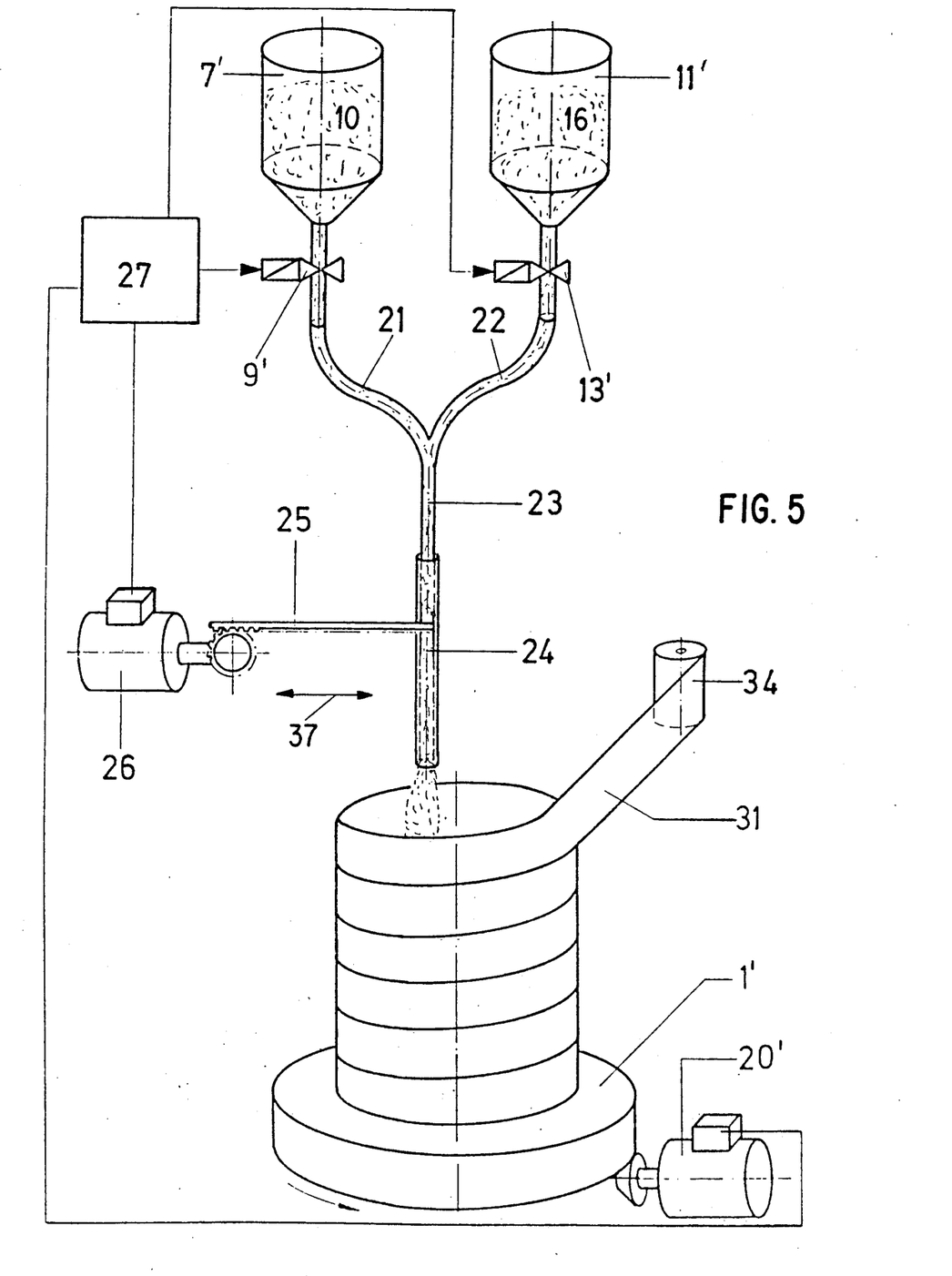
FIG. 5 shows, diagramatically, another apparatus for the method.

In FIG. 5 there is shown another system for shape-stabilizing the granular body while it is being made. The support 1' is continuously lowered during the pouring operation (by means not shown), so that the open end of the pouring spout 24 is always at the same height above the surface of the body. A band 31 is unwound from a supply roll 34 and laid continuously about the body to form a wound supporting body to define it at its circumference as it is built up. The controlling of the feed rates by the shutters 9' and 13', the horizontal movement of the pouring spout 24 by the drive 25, 26, the rotation of the support 1' by the drive 20 and its lowering, and the wrapping of the body in the supporting tape are controlled by a common process controller 27.

By the use of a computerized process controller 27, it is easily possible to make allowance for the time lag between the mixing of the components 10 and 16 and the pouring itself. It is also possible in this manner to set the apparatus up for any desired refractive index profile. Fundamentally it is possible by suitable programming of the system shown in FIG. 5 to produce any desired cross sectional distribution of the grains in the granular body, including, for example, multiple cores such as those represented in FIG. 3.

In the case of complex cross sectional geometric distributions, however, it is advantageous to pour the material onto a stationary table and to move the pouring spout across the body with a bidimensional operating means.

Figure 6:
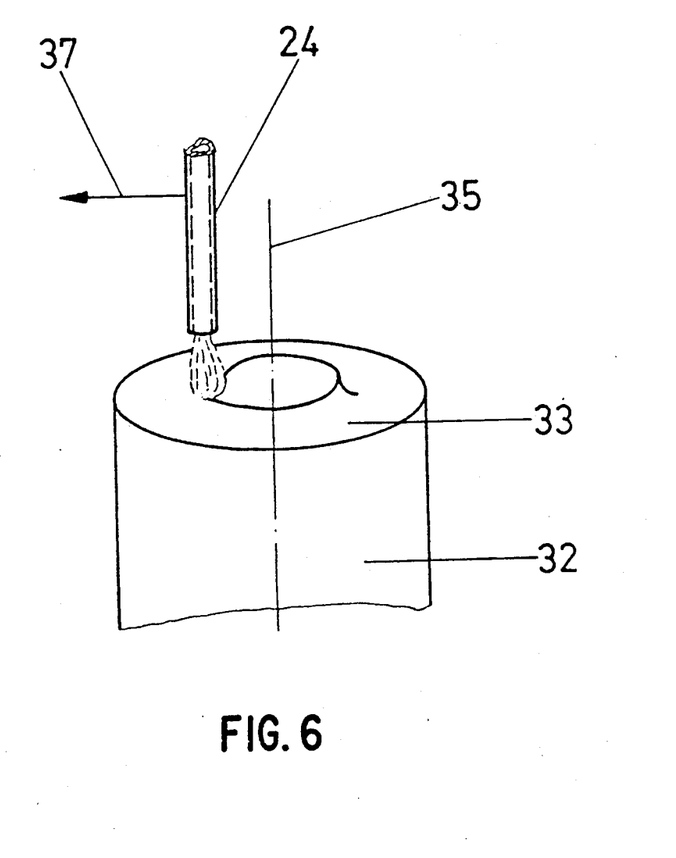
FIG. 6 shows, diagramatically, the method using a portion of the apparatus of FIG. 5.

The pouring process itself is represented in detail in FIG. 6. The surface 33 of the granular body 32 which is defined by hand 31, rotates about an axis 35. The cross section of the pouring spout 24 is very small in proportion to that of the body 32, and, with its horizontal movement in the direction of the arrow 37, it pours a layer along a spiral path. To keep the layer depth constant during each pass, the horizontal velocity must be adapted to the pouring rate according to its position. The doping profile is determined by the momentary proportion of the grains 10 and 16.

The shape of the granular body can be defined during its formation in many different ways. Two preferred embodiments are represented in FIGS. 4 and 5. Another preferred step consists in solidifying the body at its periphery while it is being created. This is done by local heating with a flame, or in an especially well-defined manner with a focused laser beam. When the local heating is sufficient, the grains vitrify in the peripheral region and adhere to one another. The result is a supporting vitreous shell, but one which does not impair the permeability of the entire body to gases. Another advantageous method of shape-stabilization is to spray the circumference of the granular body with a cement which hardens rapidly and produces a self-supporting shell in the outer circumferential area. It is preferable to select a cement which will be destroyed without leaving any residue during the high-temperature processes which follow. Organic cements are suitable for this purpose, such as epoxy resins or glues on the basis of a thermoplastic.

Another possibility for shape stabilization consists in stabilizing the entire granular body during the pouring process. This is accomplished by local heating with a flame, or better with a laser beam, such that the individual grains vitrify at the poured surface and adhere to one another without thereby appreciably impairing the permeability of the entire body to gases.

Figure 7:
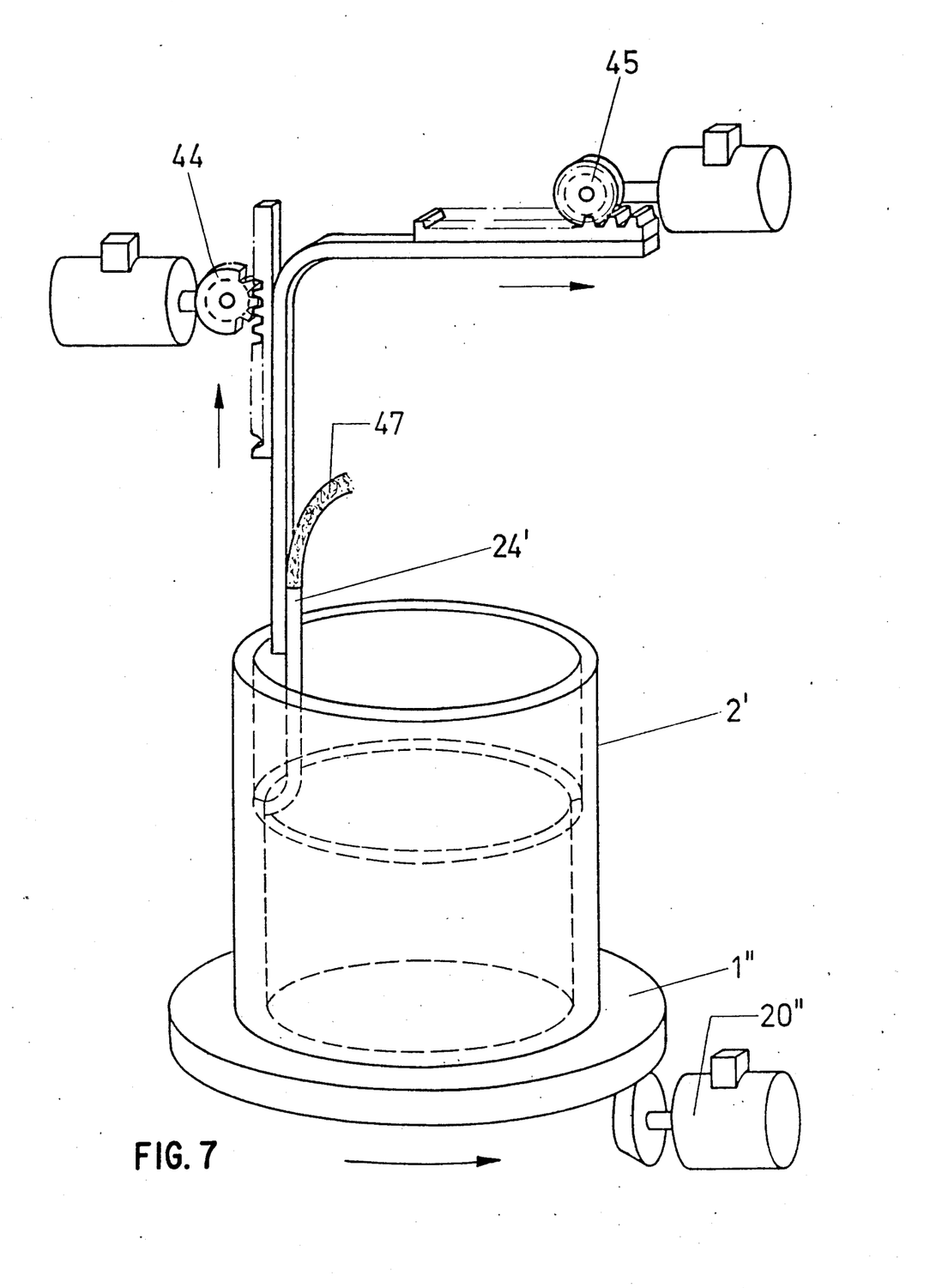
FIG. 7 shows, diagramatically, another apparatus for the method.

Another advantageous system for the practice of the method of the invention is represented in FIG. 7. On a support 1", which is set in rapid rotation by a drive 20", there is placed a tube 2' as the supporting body. By means of a pouring spout 24' which can be moved in two coordinate directions by the drives 44 and 45, premixed grains 47 are fed in a controllable ratio of admixture. The rotational speed of the revolving table is selected such that grains deposited on the inside surface of tube 2' will be held in place by centrifugal force. The granular body is then built up in layers by the upward and downward movement of the pouring spout.

The area directly about the axis of rotation, where the centrifugal force becomes low, is defined in the case of a graded index preform by an internal supporting tube (not shown) which is removed after the granular body has been transformed to a porous solid. The remaining cavity collapses when a glass body is formed from the porous body.

In like manner, a tube or rod of high-purity fused silica can be used as the internal supporting body for the preparation of a stepped index profile preform. In this case the support is not removed when the glass body is formed.

With the arrangement shown in FIG. 7, an especially high pouring rate can be achieved, since the ratio of admixture of the grains changes only slowly during the pouring, because in the movement of the pouring spout 24' in the direction of the axis of the body the ratio of the substance remains constant, while in the radial movement it changes in very small steps.

After the pouring it is advantageous to stabilize the shape of the granular body and then compress it to form a porous compact. Isostatic compression is particularly suitable for this purpose. In the example given above, in which fused silica is used n the form of glass particles produced by pyrolysis, it has been found that, by the isostatic compression of the shape-stabilized granular body at a pressure of more than 2000 bar, a stable, finely porous compact is formed, which can be handled without special precautionary measures.

Both the shape-stabilized granular body and porous compact are permeable to gases and therefore their properties can be modified by chemical treatment with gaseous substances. A chemical treatment of great practical importance in the case of fused silica is treatment for reduction of the hydroxyl content, since hydroxyl ions limit the transmission of the optic fibers in the infrared spectral range. For this purpose, it has been found desirable to expose the porous compacts or shape-stabilized granular bodies to an atmosphere of chlorine gas or helium-chlorine gas mixture in a closed vessel at temperature of 600° to 900° C. for one to five hours, depending on the size of the body and the hydroxyl content desired in the glass body. It is thus possible to lower an initial hydroxyl content of about 200 ppm to less than 0.1 ppm.

When the glass body is formed from the finely porous compact or the shape-stabilized granular body, the gases present in them must be able to escape to a sufficient extent to enable a bubble free glass mass to be formed. Bubble-free melting is facilitated if, prior to the vitrification process, a thorough outgassing of the finely porous solid or shape-stabilized granular body takes place. A heat treatment of these bodies in a vacuum at temperatures of 100 to 400° C. has been found effective for this purpose. The duration of this heat treatment is determined by the size of the bodies and the vacuum. It has furthermore been found beneficial to saturate the porous compact or shape-stabilized granular body with a protective gas like helium or hydrogen right after the degassing, because the gas content of any bubbles that might be produced in the vitrification due to the presence of residual traces of these gases can be made to diffuse out of the bodies by thermal after-treatment of the latter.

Figure 8:
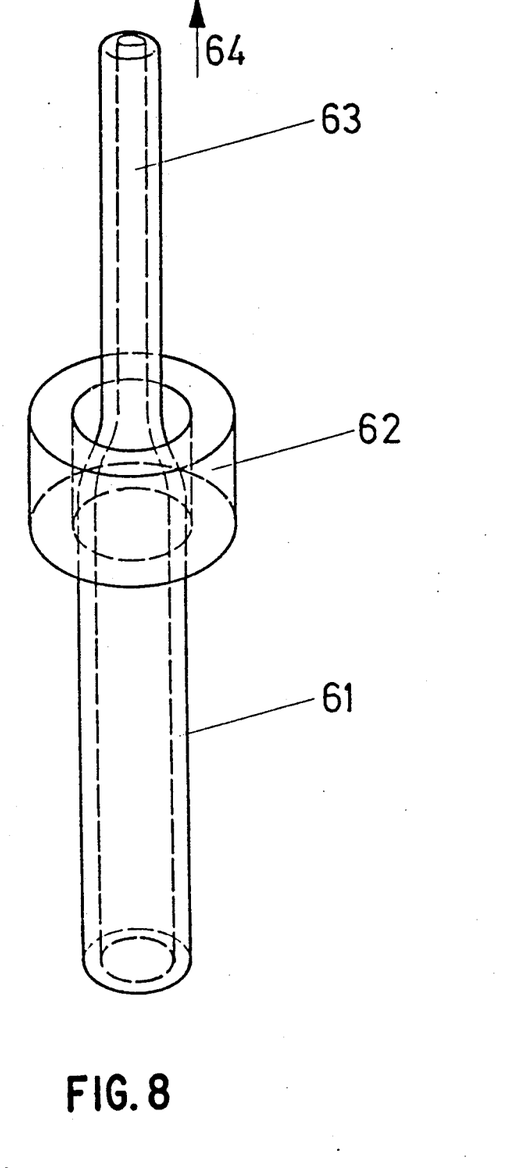
FIG. 8 shows, diagramatically, apparatus for forming a glass fiber from the granular glass body.

For vitrification, the shape-stabilized granular body or the finely porous solid body is passed through an annular kiln 62, such as the one represented diagrammatically in FIG. 8, in the direction of the arrow 64. This causes the diameter of the body to shrink, but produces no change in the pattern or geometric distribution of the glass-forming substances. Between the porous body 61 and the vitreous body 63 there forms a softening front, which is to be as well-defined as possible so as to permit gaseous inclusions to escape. This requirement is fulfilled by the annular kiln 62. In the case of a glass body of fused silica, the vitrification temperature amounts to 1500° to 1750° C.

The glass body 63 may still contain a few small bubbles and/or voids after melting. If provision has been made by appropriate pretreatment as described above so that any bubbles present contain only gases which can easily diffuse through the vitreous body at higher temperatures (e.g., helium and hydrogen in silica), the gas can easily diffuse out of these bubbles through the surrounding glass body upon appropriate heat treatment. In this manner, after such treatment the only remaining voids will be those which will vanish entirely when the glass body is drawn to smaller diameters.

A tested alternative to vitrification in an annular kiln is vitrification by hot isostatic compression. Since in this process there is no possibility for the gases included in the porous body to escape from the preform, care must be taken to see that only those gases are present in the porous body which can diffuse through the glass during subsequent heating.

The process of the invention itself is largely dependent on the size of the grains. For practical reasons, it is necessary that the grains be free-flowing. However, this is the case over a wide range of grain diameters, and free flow can be assisted, for example, by jogging or sonic vibration. To prevent any undesirable granulation from impairing the optic properties when the granular body is vitrified, the grain size for the practice of the method of the invention is chosen in the range from 0.1 micrometers to 1 millimeter. Grains with a diameter distribution between 0.1 micrometer and 100 micrometers have proven especially desirable.

In the applications thus far described for the method of the invention, the aim has been to prepare preforms which later will be used to produce optic fibers whose optic properties will be uniform over the entire length of the fiber. For use in communications terminals and in measuring instruments, it is furthermore important to have optic components, especially optic fibers, available whose optic properties, i.e., their wave guiding properties, vary within a given length. An example of practical importance is couplers, which consist of two cores situated close together within a single fiber, between which a crossover takes place on account of their close proximity, at least one transverse dimension of a core decreasing along the fiber, while the dimension of the other core increases along the fiber. While fibers or optic components in general in which the refractive index geometry varies longitudinally are very difficult or impossible to make by known methods, they can be made by the method of the invention without any particular difficulty. All that is necessary is to control the programming in relation to the depth of the grain deposit.

FIGS. 4 and 5 show for the sake of simplicity systems in which the grains are fed to the granular body through one pouring device or, as in FIG. 4, through two pouring devices. It is obvious that more than one or two pouring devices can be used simultaneously. For example, in a system similar to that of FIG. 4 for the production of multiple cores, instead of one inner casing tube 3, a number of inner casing tubes can be used which is equal to the number of the cores that are to be formed. In arrangements similar to FIG. 5, it can be advantageous to use two pouring spouts, one of which covers the cladding area and the other the core area of the granular body to be formed. Since in the cladding area only grains of one composition need to be deposited, but the amount to be laid down in very much greater than it is in the core region, this uncritical process can be performed with a spout of a high rate of delivery. It is furthermore possible to shift several pouring spouts of identical function parallel to one another in order in this manner to attain a higher pouring rate than with a single pouring spout.

It will be understood that the specification and examples are illustrative but not limitative of the present invention and that other embodiments within the spirit and scope of the invention will suggest themselves to those skilled in the art.

What is claimed is:

1. A method for manufacturing an elongate light transmissive optical glass body having a central axis and a cylindrical circumference, said elongate body having a non-uniform refractive index which decreases radially between said axis and said circumference, said method comprising the following steps:

storing grains of at least two substances which yield glass having different refractive indices, in a respective at least two hoppers, said grains having diameters in the range of 0.01 μm to 1 mm, mixing said grains in a desired proportion which will provide said non-uniform refractive index by controlled feeding into a common feed line having a pouring spout for pouring the mixed grains therefrom, pouring said grains onto a support while rotating said support about a vertical axis of rotation, moving said pouring spout radially between said vertical axis and means defining a circumference at a fixed radius from said axis while rotating said support, moving said pouring spout vertically relative to said support while rotating said support, pouring said grains from said spout during at least one of moving said spout radially and moving said spout vertically, thereby forming a cylindrical granular body having an axis coincident with said axis of rotation, and heat fusing the granular body to form said light transmissive cylindrical glass body.

2. The method of claim 1 wherein said pouring spout is moved radially back and forth between said axis and said circumference while pouring said grains, the proportion of grains from each hopper being varied during each movement between said axis and said circumference.

3. The method of claim 2 wherein said means defining a circumference of the granular body is a band which is wound continuously about said grains at said fixed radius from said axis as said grains are poured and said support is rotated.

4. The method of claim 1 wherein said means defining a circumference of the granular body is a tubular support.

5. The method of claim 4 wherein the pouring spout is moved vertically at constant radius while pouring said grains and rotating said support at sufficient speed to hold the grains against the tubular support centrifugally, thereafter moving said pouring spout radially toward said axis stepwise to a different radius at each step and moving said pouring spout vertically at each said different radius while pouring said grains.

6. The method of claim 1 wherein pouring the grains comprises feeding the grains controllably as to substance and location, said feed line comprising a tube having a cross section substantially smaller than the granular body across the direction in which the grains are piled into the granular body, thereby to build up the granular body on the support progressively with the geometric distribution of the substances controlled, which distribution corresponds to the non-uniform refractive index in the glass body.

7. The method of claim 6, wherein the grains are arranged in a geometric distribution having at least one core of substantially only grains of one of the substances within and along the axis of the granular body.

8. The method of claim 7, wherein the grains of the two substances are arranged in a transition from grains predominantly of one substance to grains predominantly of the other substance in one of a gradual and a step-wide manner.

9. The method of claim 1, wherein the grains are arranged in a geometric distribution having at least one core of substantially only grains of one of the substances within and along the axis of the granular body.

10. The method of claim 1, wherein the grains of the two substances are arranged in a transition from grains predominantly of one substance to grains predominantly of the other substance in one of a gradual and step-wide or abrupt manner.

11. The method of claim 1 comprising the additional step, after completion of the pouring, of shape stabilizing the granular body by one of heat-fusing and adhesively adhering the grains at the circumference of the granular body at least partly together.

12. The method of claim 11 further comprising compressing the granular body sufficiently that it forms a gas porous compact which can be handled without additional support therefor.

13. The method of claim 11 wherein shape-stabilizing the granular body comprises doing the same in one of a vacuum and protective atmosphere relative to the substances of the grains.

14. The method of claim 1 further comprising compressing the granular body sufficiently that it forms a gas porous compact which can be handled without additional support therefor.

15. The method of claim 14, wherein the two substances are silica based glasses and further comprising treating the gas-porous compact with one or more selected gases from the group consisting of $H_2$, He, and $Cl_2$.

16. The method of claim 1, wherein the two substances are silica based glasses and further comprising treating the granular body with one or more gasses selected from the group consisting of $H_2$, He, and $Cl_2$.

17. The method of claim 1 wherein the two substances are silica based glasses, said heat fusing causing vitrification of the substances.

18. The method of claim 17 wherein heat fusing is accomplished by hot isostatic compression.

* * * * *